United States Patent [19]

Solomon et al.

[11] Patent Number: 5,282,696
[45] Date of Patent: Feb. 1, 1994

[54] PNEUMATIC RAM PIPE REPLACEMENT

[76] Inventors: Jim Solomon, 304 S. 5th Ave., Mt. Vernon, N.Y. 10551; Robert Zlokovitz, 20 Villanova La., Dix Hills, N.Y. 11746; Robert Mennella, 82 Sherwood Dr., Ramsey, N.J. 07446

[21] Appl. No.: 969,033
[22] Filed: Oct. 30, 1992
[51] Int. Cl.$^5$ ............................................. F16L 1/00
[52] U.S. Cl. .................................. 405/184; 29/426.5; 254/29 R; 175/53; 405/154
[58] Field of Search .............. 405/184, 154, 253, 255, 405/303; 254/29 R; 72/393; 166/98, 178, 177, 55.2, 55.3, 55; 175/53, 62; 138/97, 98, 105; 29/890.031, 890.036, 426.1, 426.5, 402.03

[56] References Cited

U.S. PATENT DOCUMENTS

| | | | |
|---|---|---|---|
| 80,504 | 7/1868 | Rhoades et al. | |
| 826,329 | 7/1906 | Grabiel | |
| 982,023 | 1/1911 | Sands | |
| 1,848,325 | 3/1932 | Dealy | 405/255 X |
| 1,893,441 | 1/1933 | Parker | |
| 2,457,633 | 12/1948 | Borg | |
| 2,516,650 | 7/1950 | Shapiro et al. | 73/393 X |
| 2,902,832 | 9/1959 | Levy et al. | |
| 3,057,631 | 10/1962 | La Fleur | 29/426.5 |
| 3,451,491 | 6/1969 | Clelland | 405/184 X |
| 4,006,521 | 2/1977 | Pedone | 405/184 X |
| 4,334,804 | 6/1982 | Lindeboom | 405/253 X |
| 4,634,313 | 1/1987 | Robbins | |
| 4,637,756 | 1/1987 | Boles | 405/184 |
| 4,648,746 | 3/1987 | Abinett | 405/154 X |
| 4,685,831 | 8/1987 | Mahoney | 405/184 X |
| 5,013,188 | 5/1991 | Campbell et al. | 405/154 X |
| 5,103,903 | 4/1992 | Marks | 166/178 |
| 5,110,237 | 5/1992 | Hesse | 405/184 |

FOREIGN PATENT DOCUMENTS 2113795 8/1983 United Kingdom ................ 405/184

OTHER PUBLICATIONS

"Pneumatic Boring Tools", bulletin of Vermeer Manufacturing Company, date of publication unknown.
"Pierce Airrow Pneumatic Piercing Tools", bulletin of The Charles Machine Works, Inc., copyright 1991.

Primary Examiner—Dennis L. Taylor
Attorney, Agent, or Firm—Brooks Haidt Haffner & Delahunty

[57] ABSTRACT

An adapter on the nose of a pneumatic ram engages the end of an underground pipe and under the action of the ram drives the pipe ahead of it for removal. The adapter has a frusto-conical channel at the larger diameter end of a frusto-conical region of a nose section for receiving the end of a pipe upon radial expansion of the pipe end to thereby secure the adapter to the pipe while preventing excessive radial expansion of the pipe end.

11 Claims, 4 Drawing Sheets

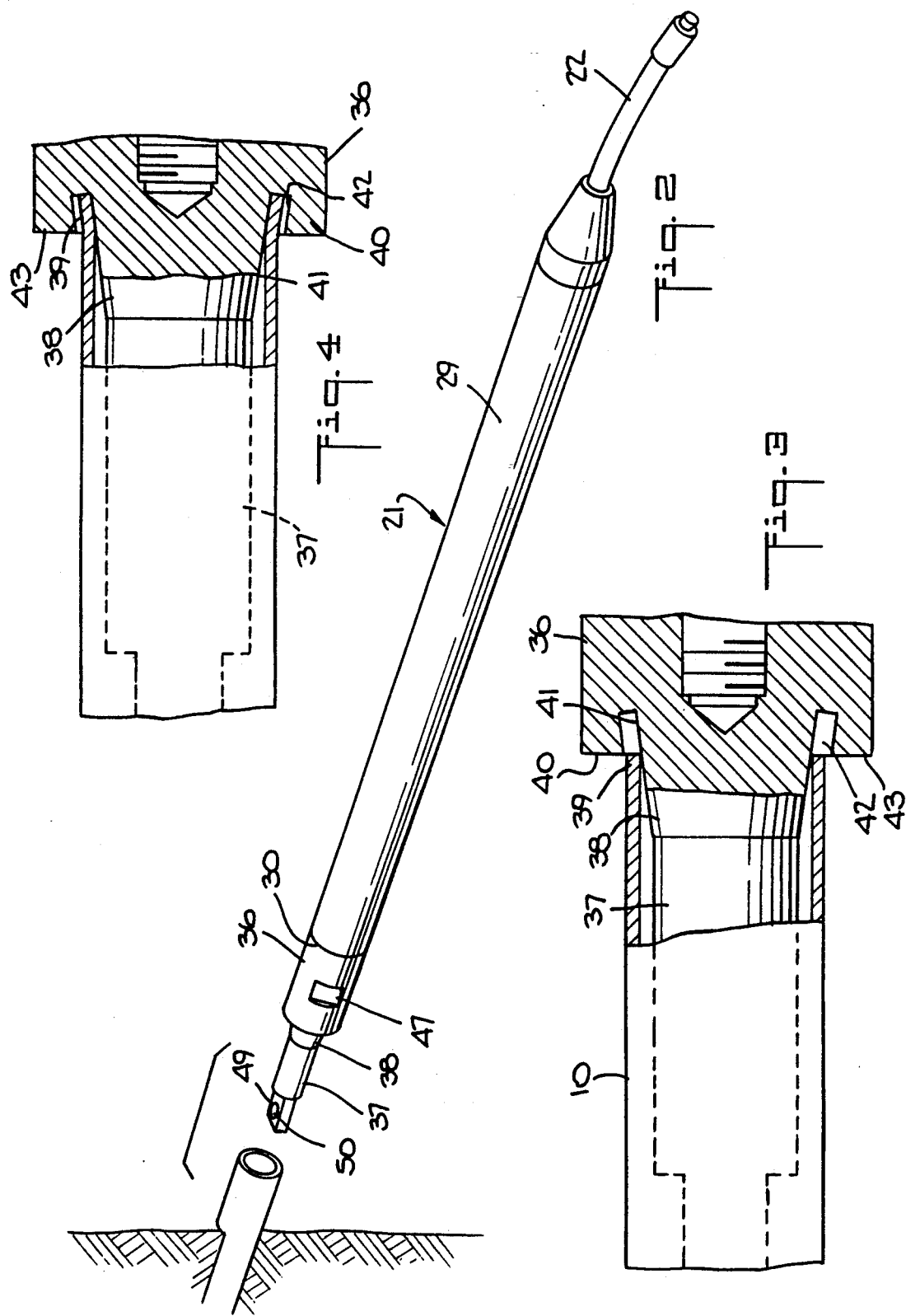

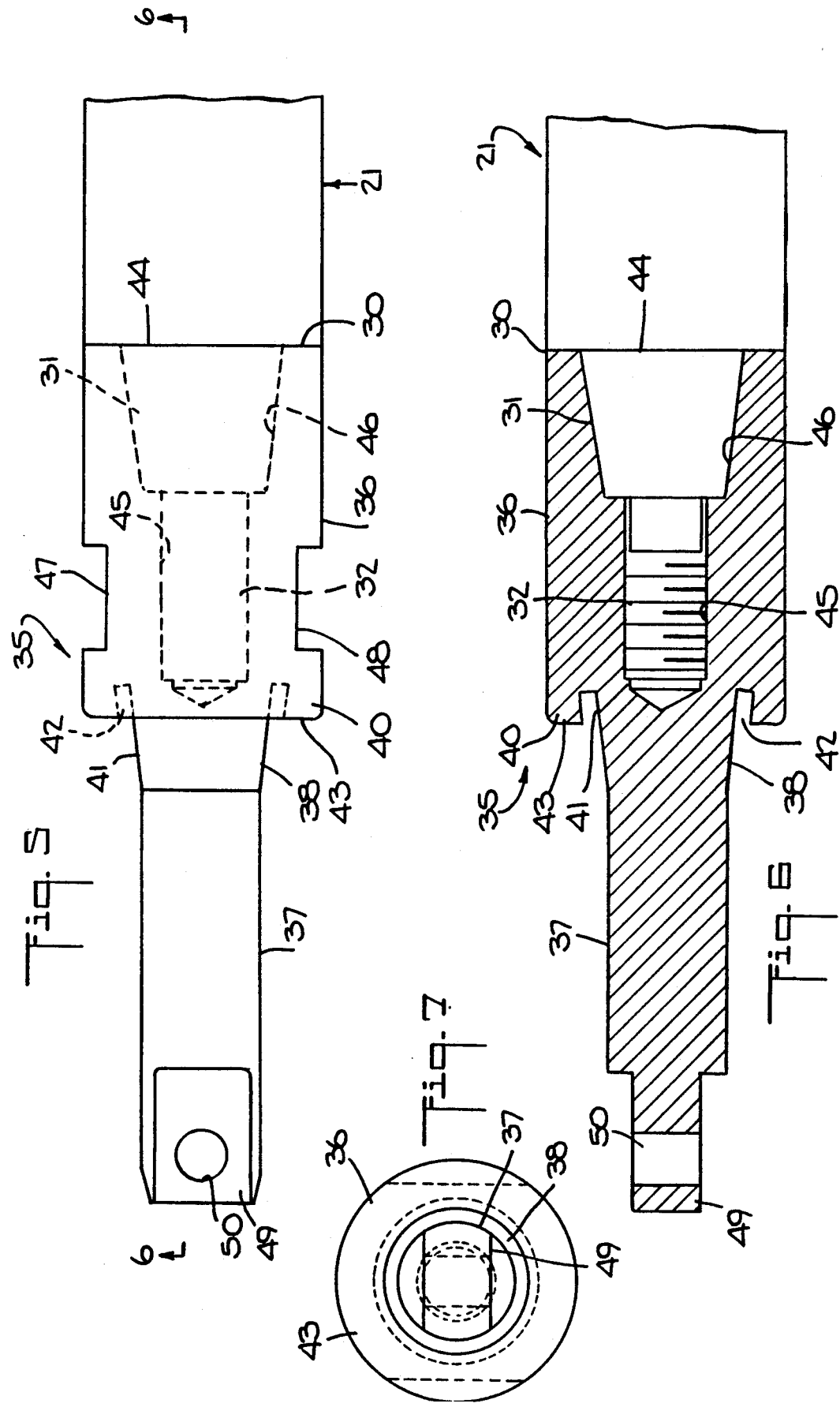

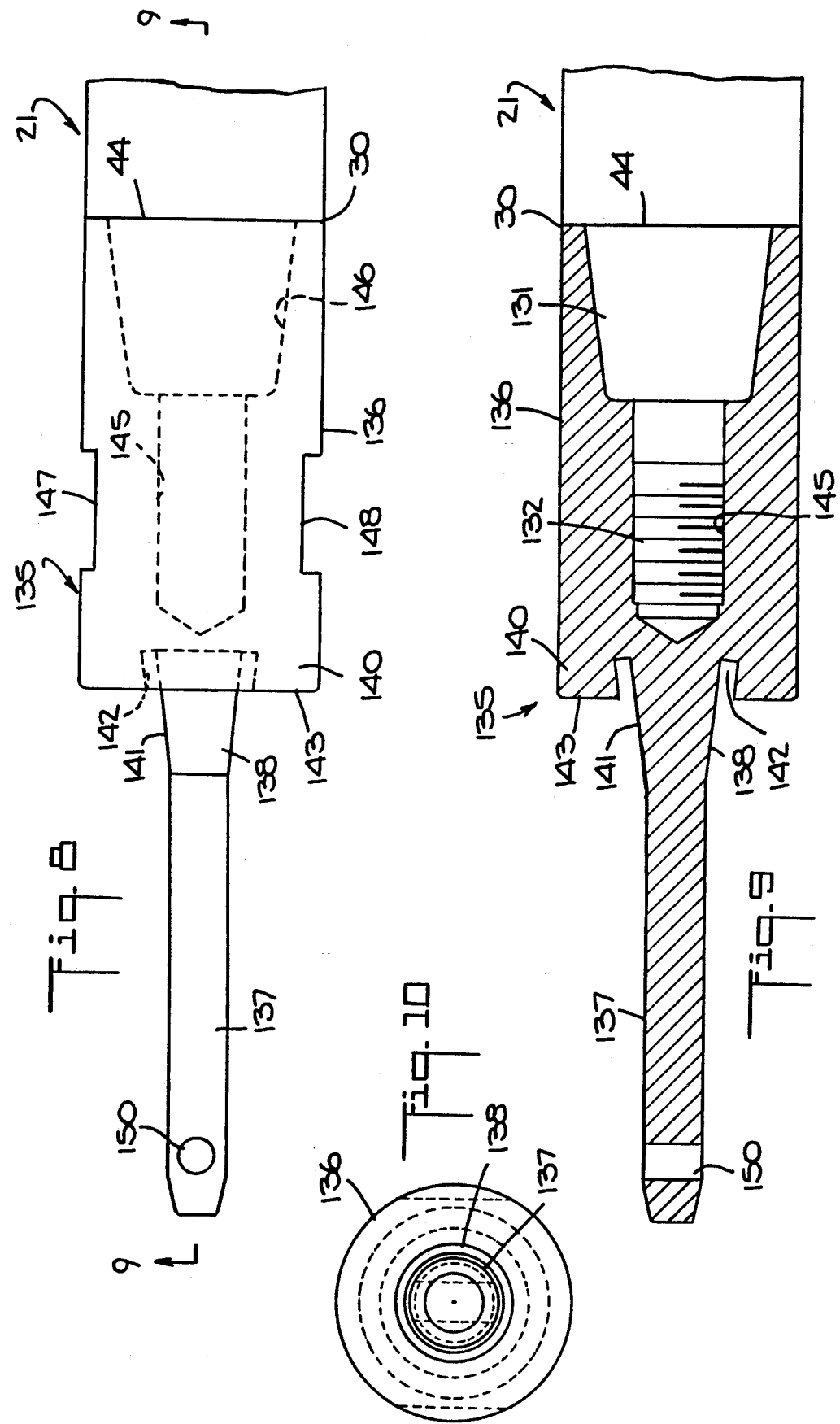

PNEUMATIC RAM PIPE REPLACEMENT

BACKGROUND OF THE INVENTION

The present invention relates to removing underground piping and more particularly to replacing deteriorating underground gas piping with new piping. The invention is of particular utility in removing deteriorating steel pipe lines used to provide gas service from the street mains into an adjacent building.

Heretofore, replacing local gas lines required excavating a trench from the building out to the main, a costly operation causing disruption of walkways and roadways. The lines require replacement as a consequence of deterioration through corrosion. The current practice is to replace the steel pipe sections with plastic piping.

Several companies produce pneumatic tools with various adapter heads for boring passages under pavements and the like to minimize the amount of trench excavating required. The known pneumatic tools are constructed to either drive a pipe before it or trail a pipe behind it as it bores a passage before it. These pneumatic tools are variously identified as "boring tools" or "piercing tools", and the like. They have also been called "missiles", "moles" and "rams". The term "pneumatic ram" will be used in the following disclosure to encompass all of such tools. As far as is known, such tools have never been adapted and used to drive an already installed pipe out from its embedment.

SUMMARY OF THE PRESENT INVENTION

Therefore, it is an object of the present invention to provide an adapter whereby a section of underground metal pipe can be driven from its underground embedment using a pneumatic ram.

It is a further object of the present invention to provide a novel method of removing and replacing buried gas pipe lines with minimum trench opening.

In accordance with one aspect of the present invention there is provided an adapter for coupling a pneumatic ram to the end of a length of pipe for pushing the pipe through embedding material, said adapter comprising a head portion and an integral nose portion projecting therefrom, said nose portion being sized and shaped to enter the end of said pipe, at least a portion of said nose portion that is adjacent said head portion being tapered with an enlarged diameter relative to the inside diameter of said pipe to expand the end of said pipe upon being urged during activation of said pneumatic ram into said pipe end, said head portion including an annular longitudinally projecting lip overhanging but radially spaced from the peripheral surface of said tapered portion thereby defining an annular frusto-conical channel varying from a larger diameter adjacent said head portion to a smaller diameter toward said nose portion for receiving the end of said pipe upon said expansion of said pipe end.

In accordance with a further aspect of the present invention there is provided a method of removing underground piping comprising the steps in combination, of establishing access to both ends of a section of pipe installed underground, assembling a pneumatic ram to one of said pipe ends through an adapter for maintaining contact with said one pipe end, actuating said ram to drive said pipe out of its embedment in the direction of said other pipe end, and removing said pipe as the pipe becomes exposed at said second end.

BRIEF DESCRIPTION OF THE DRAWINGS

The invention will be better understood after reading the following detailed description with reference to the appended drawings in which:

FIG. 2 is a perspective view of a pneumatic ram fitted with an adapter embodying the present invention and about to be engaged with the exposed end of a section of pipe to be removed in the manner shown in FIG. 1;

FIG. 3 is an enlarged fragmentary view in partial longitudinal section showing details of an adapter embodying the present invention upon initial assembly to the pipe end;

FIG. 4 is a view similar to FIG. 3 after the adapter has become attached to the pipe end;

FIG. 5 is an enlarged elevational view of the adapter of FIG. 2;

FIG. 6 is a longitudinal sectional view taken along the line 6—6 in FIG. 5;

FIG. 7 is an end elevational view of the adapter of FIG. 5;

FIG. 8 is a view similar to FIG. 5 showing a modification of the adapter.

FIG. 8 is a view similar to FIG. 6 taken along the line 9—9 in FIG. 8; and

FIG. 10 is an end elevational view of the adapter of FIG. 8.

The same reference numerals are used throughout the drawings to designate the same or similar parts.

DETAILED DESCRIPTION OF THE PRESENTLY PREFERRED EMBODIMENTS

Figure 1:
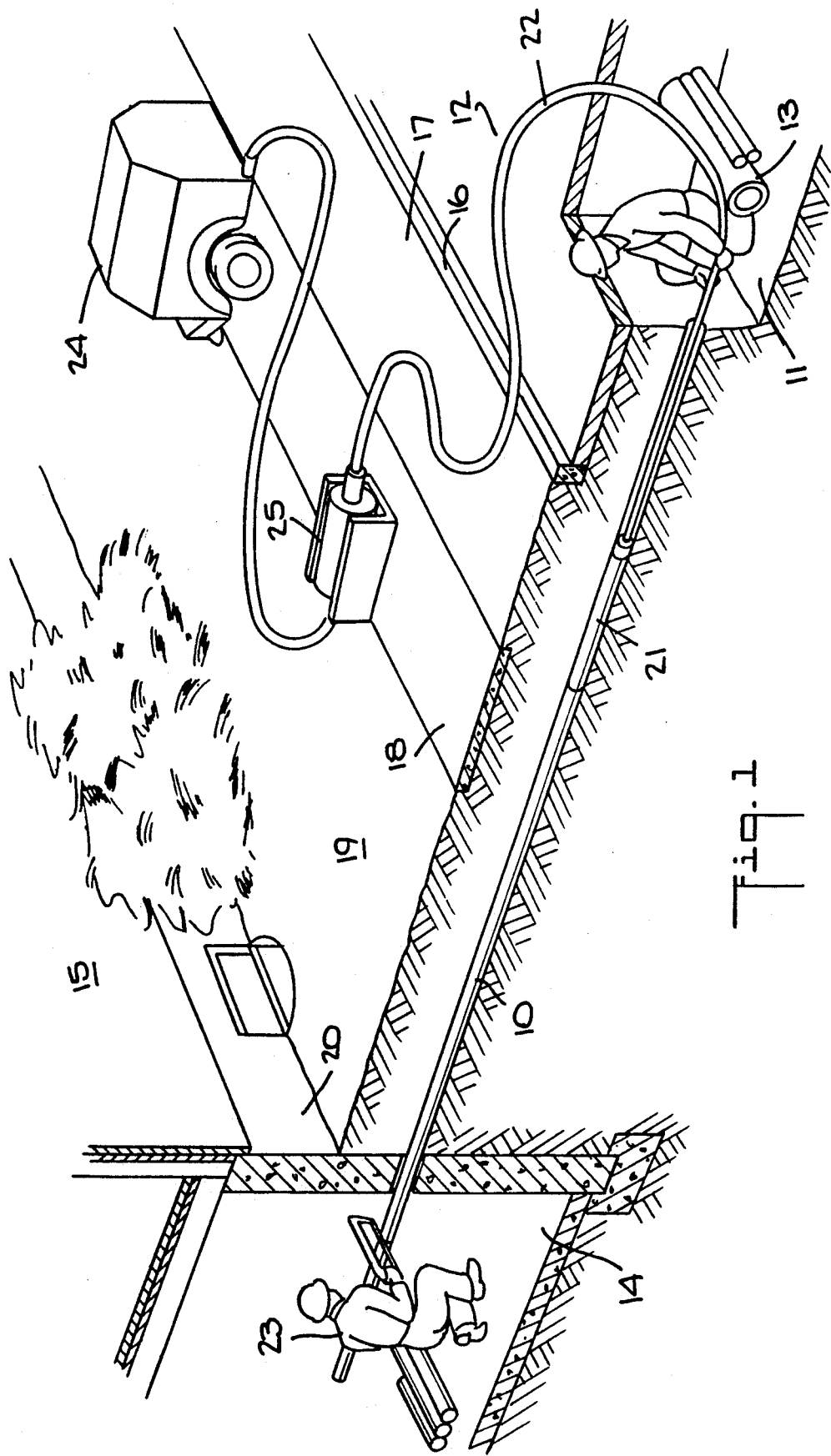
FIG. 1 is a perspective view, partly in section, showing a street scene in which a utility crew is in the process of removing an underground pipe line between a building and the main employing the present invention

Referring now to FIG. 1, there is shown an illustrative street scene, simplified as explained below, in which the present invention is employed to remove a deteriorated gas service line 10 from between an excavation pit 11 in the middle of a street 12 at the main 13 and the basement 14 of a building 15. As illustrated, the service line or pipe 10 extends below the roadway 12, curb 16, grass strip 17, sidewalk 18, landscaped area 19 to the foundation wall 20 and through the latter into the basement 14. At one time, it was necessary to dig up the entire course from the site of the main 13 all the way to the foundation wall 20. With the present invention, however, it is only necessary to excavate a pit 11 at the main and use a pneumatic ram 21 at the end of an air hose assembly 22 to drive the pipe 10 directly into the basement 14 where it is removed by a worker 23. As shown, the pipe is cut into convenient lengths for removal from the basement. If space permits, and if the pipe is short enough, it obviously can be taken out in one piece.

Those skilled in the subject art will appreciate that the illustration has been simplified. Normal practice is to install a curbside shutoff valve in the gas line. Obviously, if the pipe includes a valve, the combination can not be driven. Therefore, a pit would be excavated over the valve and the pipe driven from the valve site to the basement. The section from valve to main would be driven out separately either from the valve to the main or from the main to the valve.

A portable compressor 24 is shown connected through an interface and control unit 25 to the hose assembly 22. The details of the ram and its control form no part of the present invention and therefore have not been shown. A suitable ram is manufactured by The Charles Machine Works, Inc. of Perry, Okla., and marketed under the designation "Ditch Witch Pierce Airrow" tool. The tool is shown in FIG. 2 from the parting line 30 to the hose assembly 22 as having a long cylindrical body 29. Depending upon the diameter, the length of the body varies from 42" for a 2" diameter to 77" for a 6" diameter. As obtained from the manufacturer, the leading end of the ram 21, as best seen in FIG. 6, has a frusto-conical nose section 31 terminating in a threaded stud 32. The adapters of the present invention are threadedly assembled to the nose section 31 and stud 32 as shown in FIGS. 5 to 10.

Attention should now be directed to FIGS. 5 to 7 wherein there is illustrated an adapter 35 embodying the present invention for coupling the pneumatic ram 21 to the end of a length of pipe (not shown in these Figures) for pushing the pipe through embedding material as mentioned with reference to FIG. 1. The adapter 35 has a head portion 36 and an integral nose portion 37 projecting therefrom. The nose portion is of reduced diameter sized and shaped to enter the end of a length of pipe 10 (see FIG. 3). Returning to FIGS. 5 to 7, at least a portion 38 of the nose portion 37 that is adjacent the head portion 36 is tapered with an enlarged diameter relative to the inside diameter of the pipe 10 to expand the end 39 of the pipe 10 as shown in FIG. 4 upon being urged during activation of the pneumatic ram 21 into the pipe end 39. The head portion 36 includes an annular longitudinally projecting lip 40 overhanging but radially spaced from the peripheral surface 41 of the tapered portion 38 thereby defining an annular frusto-conical channel 42 varying from a larger diameter adjacent the head portion 36 to a smaller diameter toward the nose portion 37 for receiving the end 39 of the pipe 10 upon the aforementioned expansion of the pipe end 39, shown in FIG. 4.

The head portion 36 is generally right circular cylindrical with the nose portion 37 extending co-linearly from a first end 43 of the head portion 36 along a common longitudinal axis. The head portion 36 has a second end 44, normal to the common axis, opposite the first end 43. A threaded bore 45 extends into the head portion 36 from the end 44 coaxially therewith below a tapered entrance 46. The tapered entrance 46 and threaded bore 45 are shaped and dimensioned to mate with the nose of the ram 21.

As shown in FIGS. 2 and 5, the radial surface of the head portion 36 is provided with wrench engaging flats 47 and 48 for cooperating with a suitable tool for applying torque to the adapter 35 for assembling the adapter 35 to the pneumatic ram 21.

The leading end of the nose portion 37 has a tang 49 with a through aperture 50 to which suitable chucks of known construction can be attached for grasping the end of a plastic pipe or the like which, upon extracting of the defective pipe 10, can be drawn back from the basement into the passage vacated by the original pipe.

As best seen in FIG. 4, the tapered portion 38 and channel 42 are so configured as to lock onto the pipe end 39 during the initial impacting of the ram 21. After a few blows the adapter will become wedged into engagement with the pipe end 39 thereby serving to absorb the impact from the missile and communicate the force with maximum efficiency to the pipe. At the same time, the overhanging lip 40 restricts the radial expansion of the pipe end 39 and prevents the end of the pipe from splintering under the impact forces. The connection, however, is not so secure that the adapter 35 cannot be separated from the pipe end by a few hammer blows upon completion of the pipe extraction operation.

A slightly modified construction of the adapter is shown in FIGS. 8 to 10 in order to scale it back to a smaller diameter pipe size. Specifically, FIGS. 8 to 10 illustrate an adapter for a 1" pipe while FIGS. 5 to 7 show an adapter for a 2" pipe. In FIGS. 8 to 10 similar parts to those found in the embodiment of FIGS. 5 to 7 are designated by the same reference numeral increased by "100".

Having described the invention with reference to the presently preferred embodiments thereof it should be understood that various changes in construction and method of operation can be introduced without departing from the true spirit of the invention as defined in the appended claims.

What is claimed is:

1. An adapter for coupling a pneumatic ram to the end of a length of pipe for pushing the pipe through embedding material, said adapter comprising a head portion and an integral nose portion projecting therefrom, said nose portion being sized and shaped to enter the end of said pipe, at least a portion of said nose portion that is adjacent said head portion being tapered with a diameter adjacent said head portion that is enlarged relative to the inside diameter of said pipe to expand the end of said pipe upon being urged during activation of said pneumatic ram into said pipe end, said head portion including a annular longitudinally projecting lip overhanging with a radially inner surface radially spaced from and generally parallel to the peripheral surface of said tapered portion thereby defining an annular frusto-conical channel varying from a larger diameter adjacent said head portion to a smaller diameter toward said nose portion for receiving and locking onto the end of said pipe upon said expansion of said pipe end.

2. An adapter according to claim 1, wherein said head portion is generally right circular cylindrical with said nose portion extending co-linearly from a first end of said head portion along a common longitudinal axis, said head portion has a second end, normal to said common axis, opposite said first end, and a threaded bore extends into said head portion from said second end coaxially therewith for attaching said adapter to said pneumatic ram.

3. An adapter according to claim 2, wherein the radial surface of said head portion is provided with tool engaging means for cooperating with a tool for applying torque to said adapter for assembling said adapter to said pneumatic ram.

4. A method of removing underground piping comprising the steps in combination of establishing access to both ends of a section of pipe installed underground, assembling a pneumatic impact ram to one of said pipe ends through an adapter for maintaining contact with said one pipe end, actuating said ram to with repetitive impact said pipe out of its embedment in the direction of said other pipe end, and removing said pipe as the pipe becomes exposed at said second end.

5. A method according to claim 4, wherein said adapter has a pipe expanding cone section overhung by a lip which provides therebetween an annular frustoconical channel for receiving the end of said pipe and securing said adapter to said pipe end.

6. A method according to claim 4, comprising the further steps of coupling an end of a replacement pipe by means of said adapter to said pneumatic ram subsequent to driving said first mentioned pipe out of its embedment, and actuating said ram in reverse to draw said replacement pipe into the passage vacated by said first mentioned pipe.

7. A method according to claim 6, wherein said adapter has a pipe expanding cone section overhung by a lip which provides therebetween an annular frustoconical channel for receiving the end of said first mentioned pipe and securing said adapter to said first mentioned pipe end.

8. A method of removing underground piping comprising the steps, in combination, of establishing access to both ends of a section of pipe installed underground, assembling a pneumatic ram to one of said pipe ends through an adapter for maintaining contact with said one pipe end, actuating said ram to drive with repetitive impulses said pipe out of its embedment in the direction of said other pipe end, and severing incremental sections of said pipe from the running length as the pipe becomes exposed at said second end.

9. A method according to claim 8, wherein said adapter has a pipe expanding cone section overhung by a lip which provides therebetween an annular frustoconical channel for receiving the end of said pipe and securing said adapter to said pipe end.

10. A method according to claim 8, comprising the further steps of coupling an end of a replacement pipe by means of said adapter to said pneumatic ram subsequent to driving said first mentioned pipe out of its embedment, and actuating said ram in reverse to draw said replacement pipe into the passage vacated by said first mentioned pipe.

11. A method according to claim 10, wherein said adapter has a pipe expanding cone section overhung by a lip which provides therebetween an annular frustoconical channel for receiving the end of said first mentioned pipe and securing said adapter to said first mentioned pipe end.

* * * * *

UNITED STATES PATENT AND TRADEMARK OFFICE
CERTIFICATE OF CORRECTION

PATENT NO. : 5,282,696
DATED : February 1, 1994
INVENTOR(S) : Solomon et al

It is certified that error appears in the above-indentified patent and that said Letters Patent is hereby corrected as shown below:

Column 2, line 31, "FIG. 8" should read --FIG.9--.

Column 4, line 34, "a" should read --an--; line 62, after "to" insert --drive--; after "repetitive" insert --impulses--; line 63, delete "impact".

Signed and Sealed this

Twenty-sixth Day of July, 1994

Attest:

BRUCE LEHMAN

Attesting Officer     Commissioner of Patents and Trademarks